M. C. RIMMER.
URETHROSCOPE AND LIKE SURGICAL INSTRUMENT.
APPLICATION FILED OCT. 30, 1919.

1,345,406.

Patented July 6, 1920.

INVENTOR
Mark Cubbon Rimmer
By Lawrence Langner
Attorney

UNITED STATES PATENT OFFICE.

MARK CUBBON RIMMER, OF LONDON, ENGLAND.

URETHROSCOPE AND LIKE SURGICAL INSTRUMENT.

1,345,406.   Specification of Letters Patent.   Patented July 6, 1920.

Application filed October 30, 1919. Serial No. 334,413.

*To all whom it may concern:*

Be it known that I, MARK CUBBON RIMMER, subject of the King of Great Britain, and resident of London, in the county of London, England, have invented certain new and useful Improvements in Urethroscopes and like Surgical Instruments, of which the following is a specification.

This invention has reference to urethroscopes, auriscopes, nasal or other specula, bronchoscopes, œsophagoscopes, sigmoidoscopes, cystoscopes, and like surgical instruments for the examination of and operation upon the cavities or passages of the body.

In instruments of the kind to which this invention relates as heretofore constructed the operating instruments are usually introduced through an aperture in the observation lens or eye piece an arrangement which manifestly possesses many disadvantages as owing to the end of the operating instrument protruding from the eye piece the operator is not only prevented from obtaining an unobstructed view of the cavity or passage under examination but is considerably hampered in the manipulation of the operating instrument.

Now the primary object of the present invention is to provide an improved surgical instrument of the aforesaid kind whereby an uninterrupted visual and operative field may be obtained thus facilitating accurate diagnosis and appropriate treatment.

With this object in view and such others as may hereinafter appear or are incidental thereto my invention in its broadest aspect may be said to be embodied in a construction of the aforesaid kind in which the manipulation of the operating instruments is effected by means arranged laterally of the urethroscope or other like instrument.

Figure 1:
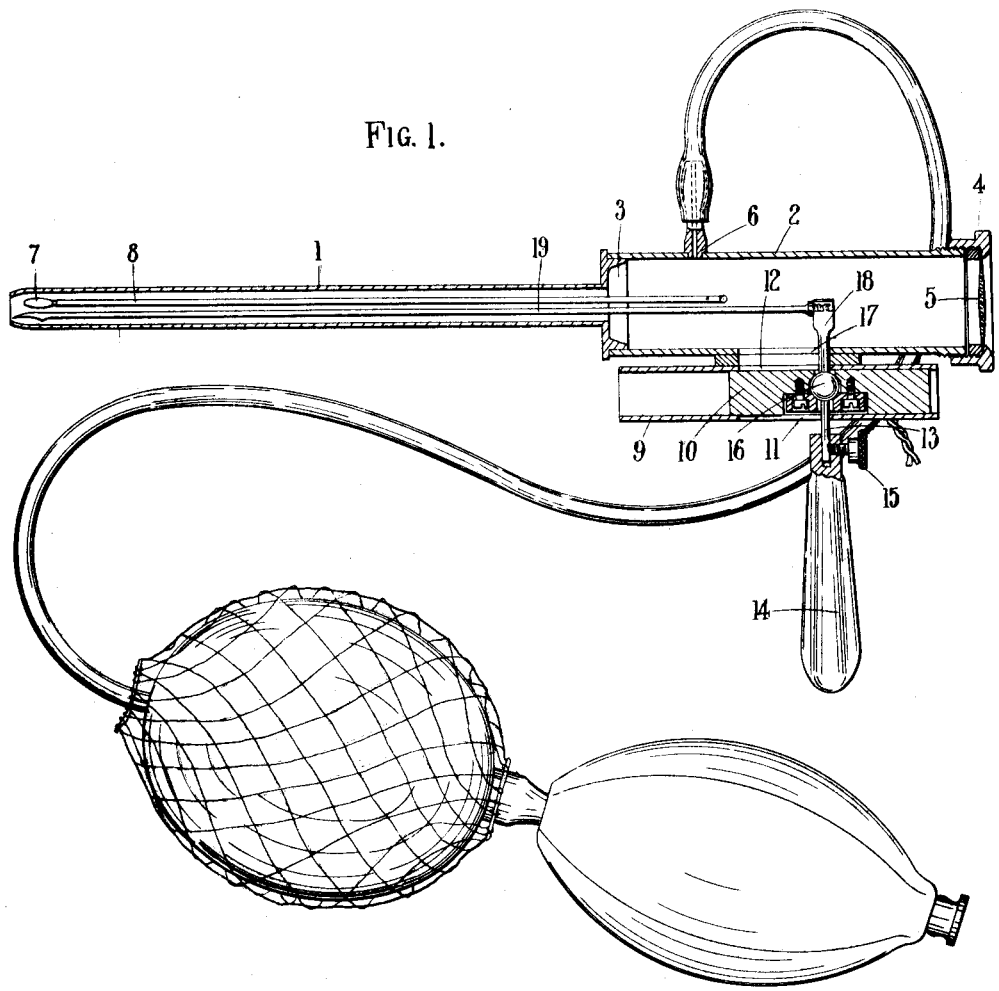
Figure 2:
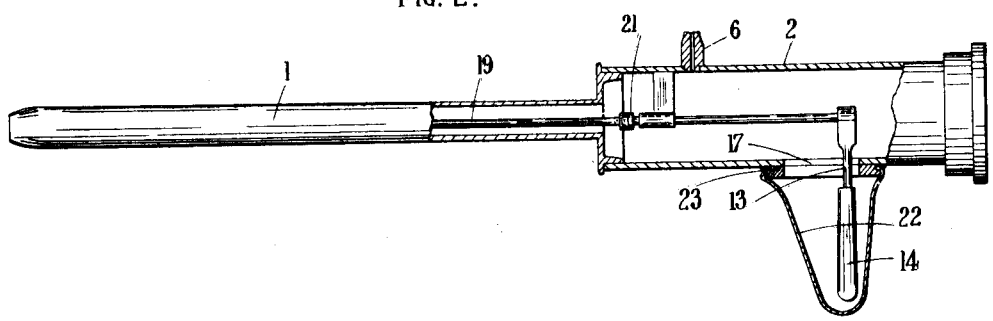

In order that my invention may be readily understood and carried into effect by those skilled in the art to which it appertains I will now proceed to describe the same in detail for which purpose reference is made to the accompanying drawings in which:

Figure 1 represents a longitudinal section of a urethroscope embodying this invention and Fig. 2 represents a similar view of a modified construction.

The urethroscope represented in the drawings is of the type provided with direct illumination and having means for causing direct inflation of the passage or cavity under examination. It comprises the usual endoscope or urethral tube 1 having an air chamber 2 adapted for air tight attachment thereto by frictional engagement with the boss 3 formed on the urethral tube. The back of the air chamber 2 is provided with an examination and operating cap 4 in screw threaded engagement therewith and having a lens 5 mounted therein of a focal length corresponding to the length of the whole instrument.

Inflation or distension of the cavity or passage under examination is effected by introducing air or fluid from an appropriate bellows applied to the nipple 6 and the requisite illumination is provided for by the incandescent electric lamp 7 carried by the tube 8 which passes to the exterior of the air chamber 2 and through which the leads for supplying current to the lamp 7 are led in the usual manner as will be well understood by those familiar with instruments of the kind to which this invention relates.

Secured to the side of the air chamber 2 is a cylinder 9 having a piston 10 slidably mounted therein. The cylinder is slotted at 11 and 12 to admit of transverse movement of a spindle 13 to which the operating handle 14 is detachably connected such as by a set screw 15. The spindle 13 is in operative connection with a ball and socket joint 16 housed in the piston 10 and is continued through the slot 12 and a registering slot 17 in the wall of the air chamber 2 so as to project within this latter where it terminates in a block 18 having a screw threaded aperture therein whereby the operating instrument such as a knife 19 may be engaged as clearly shown in the drawing.

In the modified construction illustrated in Fig. 2 the spindle 13 passes directly through the slot 17 formed in the wall of the air chamber 2 and is provided with an arm 20 slidably supported in a bracket 21 depending from the inner annular wall of the air chamber 2. The operating handle 14 is connected to the spindle 13 to admit of manipulation of the operating instrument 19 as will be readily understood and in order to prevent leakage of the air or fluid employed for inflation of the cavity or passage under examination a sleeve 22 of rubber or other resilient material is secured to the air chamber 2 such as by means of the recessed flange 23 formed thereon.

The mode of using a surgical instrument embodying my invention will be apparent to those skilled in surgery but the advantages obtained by the improved construction may be briefly mentioned. Among the most important of these is the great facility with which examination and diagnosis may be made as the operator is enabled to bring his eye close to the lens and thus obtain a clear and unobstructed visual field and owing to the fact that the operating instruments can be readily manipulated from the side or laterally of the urethroscope or similar instrument by means of the handle 14 the appropriate treatment may be accorded to the lesion much more readily and satisfactorily than is the case where the operating instruments have to be manipulated from the end of the urethroscope. Furthermore by means of the ball and socket arrangement whereby the operating instruments are manipulated not only may these latter be projected beyond the distal end of the urethral tube in an axial direction with respect to the whole instrument but they may be moved in any desired angular direction relatively thereto thus greatly facilitating the treatment which is to be accorded. The provision of a substantially fluid tight joint between the laterally disposed handle 14 and the operating instrument for the time being employed effectually maintains the requisite fluid pressure within the urethroscope or similar instrument during use, a condition precedent to successful examination and operation.

It will of course be apparent that a surgical instrument embodying the features of my invention may be used for all purposes and in a similar manner to that in which instruments of this kind are ordinarily employed for example the usual pilot may be inserted in the urethral tube 1 after detaching the air chamber 2 to facilitate the introduction of the instrument and various bougies and metal sounds may be inserted all as will be well understood without further description.

While I have described the preferred construction of an instrument under this invention I desire it to be understood that I do not desire to be limited to the specific constructions hereinbefore described and illustrated but regard as falling within the scope of my invention any instrument of the kind referred to in which the operating instruments may be manipulated through a lateral opening formed in the wall of the air chamber.

What I claim is:—

1. In a surgical instrument of the kind referred to, the combination with an endoscope; of an air chamber detachably connected therewith; an examination and operating cap and lens secured to the end of said air chamber; a laterally disposed aperture in the wall of said air chamber; a spindle passing through said aperture; means for connecting an operating instrument to said spindle; a handle projecting laterally from said air chamber whereby the operating instrument may be manipulated; means for introducing a fluid to the interior of the surgical instrument; and means for illuminating said instrument.

2. The combination with a surgical instrument of the kind referred to; of an air chamber; means whereby the operating instruments may be manipulated through a lateral aperture therein; means for preventing escape of fluid through said aperture; a cylinder secured to said air chamber; a piston in said cylinder; a ball and socket joint in said piston; means associated with said ball and socket joint for manipulating an operating instrument; means for introducing fluid to the interior of the surgical instrument; and means for illuminating said instrument.

3. In a surgical instrument of the kind referred to, the combination with an endoscope; of an air chamber detachably connected therewith; an examination and operating cap and lens secured to the end of said air chamber; a laterally disposed aperture in the wall of said air chamber a cylinder secured to said air chamber; a piston mounted for reciprocation in said cylinder; means associated with said piston for supporting an operating instrument within the surgical instrument; and means for manipulating said operating instrument said means being located laterally of said instrument.

4. A surgical instrument of the kind referred to having a spindle passing through a lateral opening therein, means for reciprocating said spindle axially of the instrument, an operating instrument secured to said spindle, and means for preventing escape of fluid through said lateral opening.

Signed at London, England, in the county of London and State of Great Britain, this 9th day of October A. D. 1919.

MARK CUBBON RIMMER.